United States Patent [19]

Huber

[11] 4,150,887

[45] Apr. 24, 1979

[54] SWITCHING DEVICE FOR PROJECTION LAMP

[75] Inventor: Franz Huber, Vienna, Austria

[73] Assignees: Karl Vockenhuber; Raimund Hauser, both of Vienna, Austria

[21] Appl. No.: 851,496

[22] Filed: Nov. 14, 1977

[30] Foreign Application Priority Data

Nov. 30, 1976 [AT] Austria ................ 8870/76

[51] Int. Cl.$^2$ ............................................. G03B 21/20
[52] U.S. Cl. ...................................... 353/85; 353/87; 353/52
[58] Field of Search ........................... 353/52, 85, 87; 352/198, 203; 362/11–13, 20

[56] References Cited

U.S. PATENT DOCUMENTS

| | | | |
|---|---|---|---|
| 1,064,010 | 6/1913 | Roebuck | 353/86 X |
| 3,039,022 | 6/1962 | D'Arcy | 315/278 |
| 3,848,982 | 11/1974 | Shoji et al. | 353/87 X |

*Primary Examiner*—Harry N. Haroian
*Attorney, Agent, or Firm*—Martin A. Farber

[57] ABSTRACT

A switching device for a projection lamp of a projector wherein an electrical control device, which is separated from the projector and which supplies the projector lamp with electrical energy, is controllable from the projector by a control device via at least one control connection disposed on the projector.

9 Claims, 6 Drawing Figures

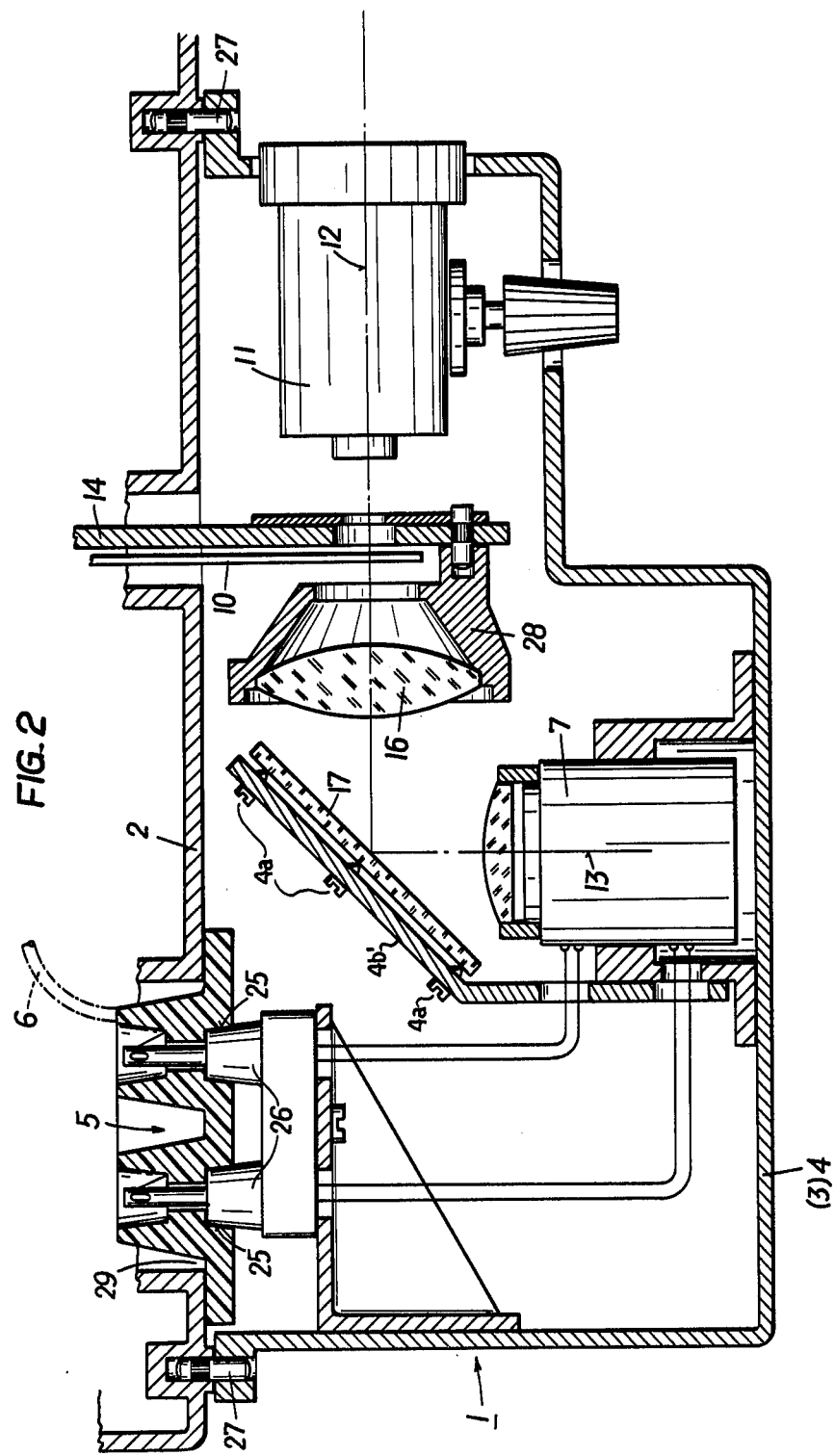

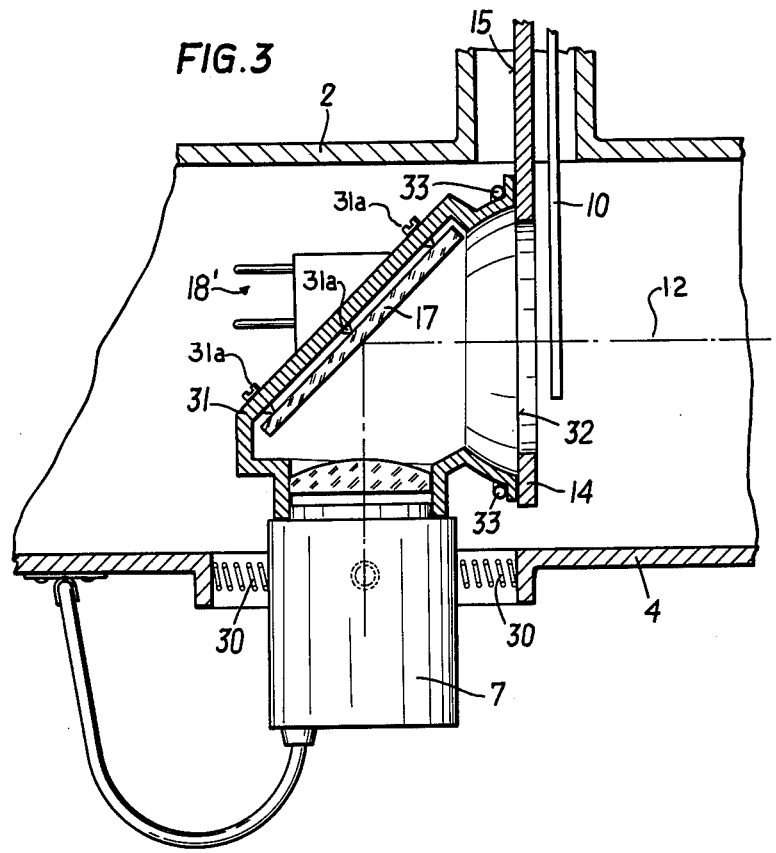
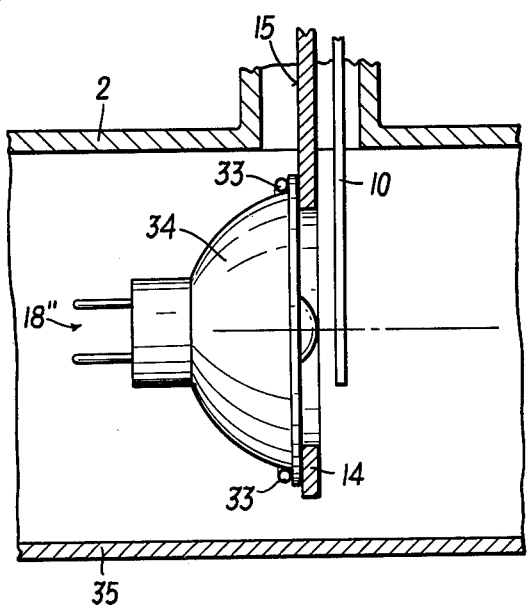

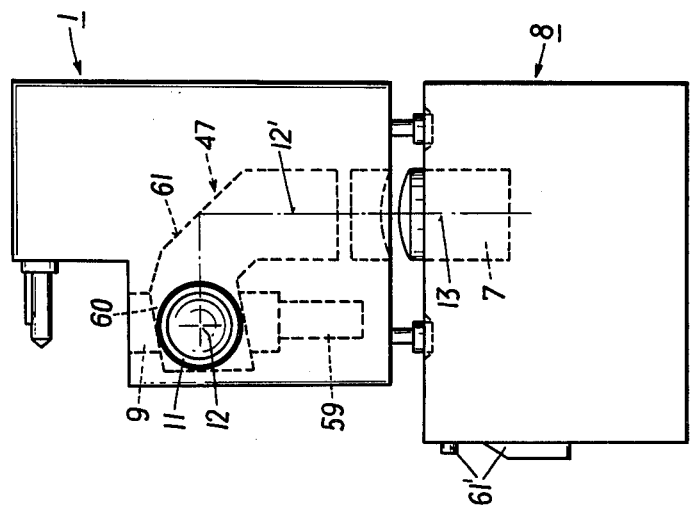
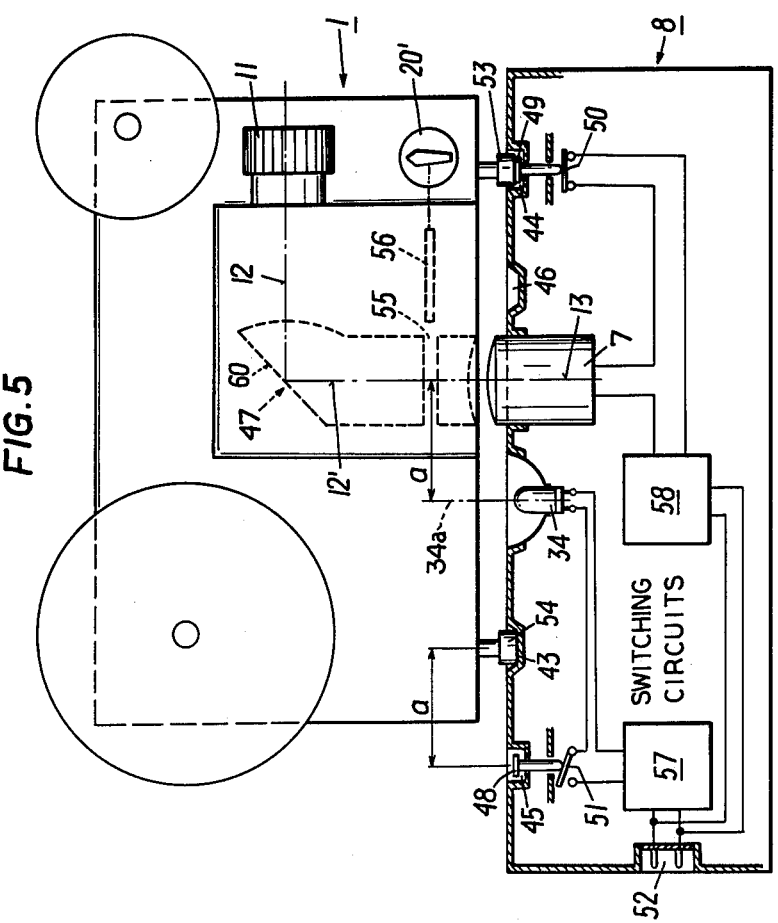

SWITCHING DEVICE FOR PROJECTION LAMP

FIELD OF THE INVENTION

The invention relates to a switching device for a projection lamp, especially a gaseous discharge lamp, which needs a relatively large electrical control unit that normally is separated from the projector.

BACKGROUND OF THE INVENTION

Such a device is known from U.S. Pat. No. 3,039,022. With this device it was disadvantageous that all control functions were carried out by means of the electrical control unit, so that the transmission of control commands from the electrical control unit to the mechanical parts of the projector had to be effected by means of relatively expensive magnets.

SUMMARY OF THE INVENTION

It is an object of the present invention to create a simplified and less expensive control means, which in accordance with another object of the invention is aided in its accomplishment in the manner that the control device is arranged on the projector in a manner known per se and the electrical control unit is controllable from the projector by means of the control device via at least one control terminal or connection provided on the projector. This offers the particular advantage that in a preferred embodiment the control circuit can be separated from the supply circuit of the electrical control unit, thus increasing the safety for the user and simplified safety instructions or regulations are able to be used for the projector itself, respectively.

BRIEF DESCRIPTION OF THE DRAWINGS

With the above and other objects and advantages in view, the present invention will become more clearly understood in connection with the following detailed description of preferred embodiments when considered with the accompanying drawings, of which:

FIGS. 1-3 show three different embodiments in similar longitudinal cross-sectional views of the projection light system in accordance with the invention;

FIG. 4 shows the arrangement according to FIG. 3 but with a halogen lamp; and

FIGS. 5 and 6 show a side and front view, respectively, of a further embodiment of the invention.

SPECIFIC DESCRIPTION

Figure 1:
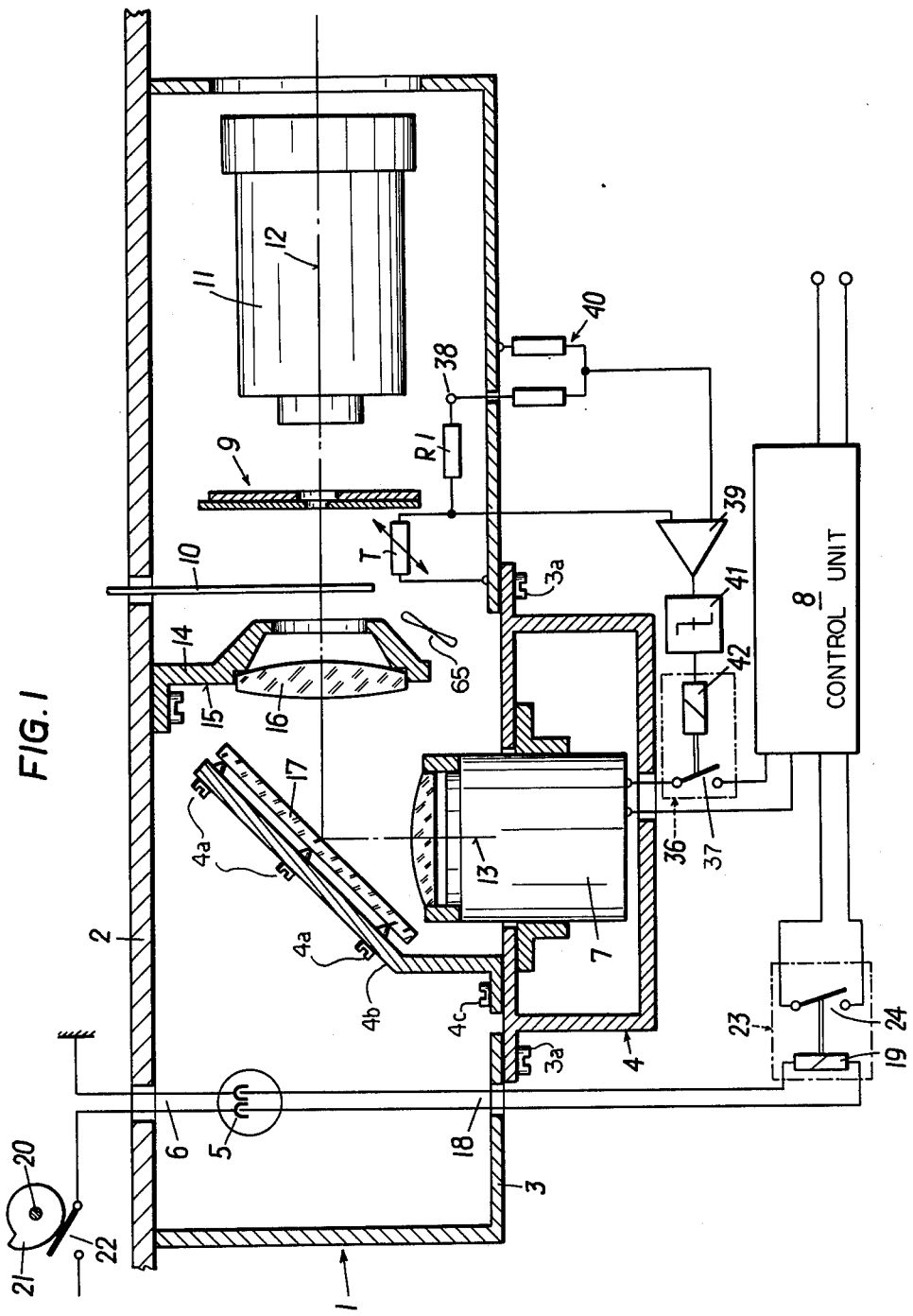

Referring now to the drawings, and more particularly to FIG. 1, a projector 1 has a wall 2, to which normally an additional projector wall surrounding the projection lamp system is added. According to FIG. 1, however, this additional projector wall is replaced by a wall 3 similar in shape, which is joined to a projection lamp housing 4 via securing screws 3a. While normally a halogen lamp is connected to a plug socket 5 of the projector, to which supply lines 6 lead, as illustrated in FIG. 1 a lamp 7 which is mounted in the lamp housing 4 is an arc lamp, the latter being controllable by means of an electrical control unit 8, the latter being separated from the projector casing and lamp housing.

In other respects the projector 1 as usual has a film gate 9 (schematically indicated) forming a film aperture for guiding and framing a moving film, a shutter blade 10, and an objective 11 with an optical axis 12. Therefore, when the wall 3, along with the lamp housing 4 connected therefor, is fixed to the wall 2, care must be taken that the optical axis 13 of the lamp 7 is centered with the optical axis 12 of the projector; a coarse centering alignment of the optical axes 12 and 13 is made by connecting the wall 3 along with the lamp housing 4 to the wall 2, as well as by connecting the lamp housing 4 with the wall 3 by means of the securing screws 3a.

In addition, control of the projection lamp 7 should be possible in correspondence with the modes of operation of the projector 1, e.g., forward running or rewind with normal or fast speed, idle, etc. This is achieved by operatively also connecting the mode selector switch for the projector which is disposed on the projector to the control unit 8 of the projection lamp 7.

In order to simplify centering, a lens 16, by means of which, as has been found, the tolerances can be increased by adjusting the surface mirror 17 (e.g., by means of adjustment screws 4a), is inserted into an opening of a centering wall 14 on the surface 15 of which a halogen lamp normally abuts. A lamp housing attachment 4b is secured to the lamp housing 4 by screws 4c which cooperatively also provide the coarse centering alignment of the optical axes 12, 13. The adjustment screws 4a are displaceably disposed in threaded bores in the inclined attachment 4b for the mirror 17, the screws 4a abutting the rear side of the mirror 17 with their narrowed ends. The mirror 17 is held against the screws by clamping means (not illustrated) known per se.

In order to be able to control the lamp 7 (instead of the halogen lamp) from the projector, the housing 3 is provided with a connection lead or terminal 18 for the plug socket 5. An electromagnet 19 is connected to the connection lead 18. A manually operable mode selector switch of the projector 1 disposed on the latter has on its shaft 20 a cam 21 for controlling a switch 22 in the electrical circuit of the plug socket 5. If the electromagnet 19 is connected to the plug socket 5 via the connection lead 18, the magnet is controlled in the same manner as the halogen lamp which is normally connected to the plug socket 5.

The magnet 19 is part of a relay 23, the latter containing a switch 24 which lies in the electrical circuit of the control apparatus 8 and thus also of the lamp 7. It is thereby guaranteed that the lamp 7 is controlled by the mode selector 20-21 of the projector 1 in the same manner as the halogen lamp which is normally connected to the plug socket 5. The mechanical parts of the projector 1 are also controlled by the mode selector in a manner not shown but known per se, the latter controlling at least one operation mode of the projector.

A further relay 36 with a switch 37 interrupts the lamp circuit (which leads to the electrical control unit 8) when the cooling system 65 (schematically illustrated) in the area of the aperture of the film gate 9 is insufficient or does not function at all. For this purpose a thermostat T, which, on the one hand is grounded, is coupled with a resistance R1 as a voltage divider of voltage derived from a terminal 38. This voltage divider forms one input of a comparator stage 39, the other input of which is formed by a reference voltage divider 40. A switching stage 41 is connected to the output of the comparator stage 39. The switching stage 41, for example, in the form of a threshold level switch, controls a magnet 42 of the relay 36, which magnet in turn is connected to the switch 37. If the temperature in the thermostat T should rise above a certain value, the switch 37 is opened, which turns off the lamp 7, so that overheating of the film in the film gate 9 is avoided.

FIG. 2 shows an embodiment in which the plug socket 5 schematically indicated in FIG. 1 is shown in detail and the connections for a one-piece lamp housing 4 formed by the wall 3 of FIG. 1 are illustrated. Advantageously the plug socket 5 is formed with centering surfaces 25 for centering pins 26 of the lamp housing 4, whereby together with the other centering pins 27, a rough centering alignment of both optical axes 12, 13 is achieved. The fine adjustment for aligning the optical axis 13 of the light emitted from the lamp 7 with the optical axis 12 of the projector objective 11 is brought about by the adjustment screws 4a in the housing attachment 4b' for the surface mirror 17. In addition, again the lens 16 can be provided for the wall 14 or for a mounting 28 connected thereto, to which mounting the halogen lamp is normally attached. The projector 1 is easily convertible by removing the lamp housing 4 from the wall 2 of the projector 1 and replacing the lens 16 by the normal halogen lamp which must be connected to the plug socket 5. When necessary under the circumstances, the plug socket 5 can be detachably inserted into an opening 29 of the wall 2 when using the lamp housing 4, whereas the plug socket 5 with its supply lines 6 is moved into the casing and normally attached to the halogen lamp, the latter being disposed in the mounting 28.

According to the embodiment of FIG. 3, the lamp 7 is connected to the lamp housing 4 by means of springs 30, thus resiliently adjustable relative thereto, whereas it is rigidly fixed to a mirror housing 31 for the surface mirror 17, the mirror housing having therein three triangularly positioned adjustable screws 31a for adjusting the mirror 17 for aligning the light emitted from the lamp 7 with the optical axis 12 of the projector, the mirror housing 31 having the shape of a halogen lamp on the side thereof adjacent to and facing the surface 15 of the wall 14. Thus the mirror housing 31 with its front surface 32 can be pressed against the surface 15 of the wall 14 by means of spring wires 33, as is normally done with a halogen lamp, the front surface 32 constituting a cooperatively engaging surface for alignment with the aligning surface 15, the latter usually provided in the projector. The mirror housing 31 at the same time can be provided with connections or terminals 18' for the plug socket 5 (not shown here) to be attached thereon. Coarse centering alignment is thus provided by engagement of the surfaces 15 and 32 as well as securing of the lamp housing 4 relative to the wall 2; and the fine centering alignment is provided by the adjustment screws 31a.

FIG. 4 shows the device according to FIG. 3, however, with a halogen lamp 34 inserted, whereby the lamp housing 4 is replaced by an interchangeable projector casing wall 35. Here the spring wires 33 clamp the halogen lamp 34 via its flanged front portion against the surface 15 of the wall 14. The halogen lamp 34 is provided with connection prongs 18" on which the plug socket 5 (not shown in FIG. 4) engages.

FIGS. 5 and 6 show an especially advantageous embodiment with which the lamp housing, which is detachably connectable to the projector 1, is formed by the housing of the electrical control unit 8 itself. The electrical control unit 8 serves as a base upon which the projector 1 is placed. As is shown schematically in FIG. 5, the lamps 7, 34 are arranged at a distance "a" from one another. The housing of the electrical control unit 8 has centering recesses 43, 44 and 45, 46, respectively, coordinated to one another, which have the same spacing "a" from each other.

If therefore the projector 1 is placed in the centering recesses 43, 44, a light guide 47 which is provided in the projector 1 is located with its vertical optical axis 12' in a precisely aligned position in relation to the optical axis 13 of the lamp 7. If, however, the projector 1 is placed in the recesses 45, 46, the vertical optical axis 12' of the light guide 47 aligns itself precisely with the optical axis 34a of the halogen lamp 34. In this manner the projector is easily adjustable with respect to its light source.

In order to be able to control the lamps 7 and 34, respectively, the centering recesses 44, 45 contain a switching key or push button 49 or 48, by means of which a normally open switch 50 and 51, respectively, in the electrical circuit of the lamps 7 or 34 is able to be actuated. If the electrical control unit 8 is connected to the power supply by means of a plug socket 52, the circuit of the lamps 7, 34 is normally, nevertheless interrupted as long as both switches 50, 51 are open. Only when the projector 1 is inserted into the respective recesses 43, 44 or 45, 46, respectively, is the corresponding switch 50 or 51, respectively, simultaneously closed, so that the respective lamp 7 or 34 is illuminated. Since the light of these lamps is guided to the film by means of the light guide 47, and in addition, the projector can be provided with a cooling system in the usual manner, the advantage is provided that there is better protection of the film against the heat emitted by the lamps. The light guide 47 can also be provided with an infrared absorbent coating and filter, respectively, at least in its center range about its axis 12'.

In the above-mentioned case the control device for the lamps 7, 34 would simply be formed by the feet 53, 54 of the projector 1. Such a construction has the advantage that no electrical connections between the projector 1 and the electrical control unit 8 are necessary. The disadvantage that the film is constantly illuminated can easily be avoided if the light guide 47 is divided and forms a slot 55 into which a shutter plate 56 can be pushed, the latter being controlled by the operating mode selector switch 20' of the projector. Should, however, the control of the switches 50, 51 prove to be advantageous by means of the operating mode selector switch 20', the projector feet 53 and 54, respectively, can be made hollow, and contain a push rod which is controlled by the operating mode selector switch 20', the push rod actuating the respective switch 50 and 51, respectively, instead of the switching key 48 and 49, respectively. If desired, a supply line 6, 18 can be provided in accordance with FIG. 1, the supply line being directly controllable by a cam 21 of the operating mode selector switch 20'. In FIG. 5 the schematically indicated switching circuits 57, 58 for the associated lamps 34 and 7, respectively, are known per se.

In FIG. 6 a practical construction of the light guide 47 is shown. While FIG. 5 shows the projector 1 in a side view, FIG. 6 is a front view. Here the film gate 9 is schematically indicated behind the objective 11, a film channel 59 being joined to the lower part of the film gate. If the light guide 47 were to be located directly underneath the objective 11, the film channel 59 would have to be moved, which would undoubtedly cause difficulties. Therefore, the light guide 47 is bent and, besides having the mirror surface 60 disposed behind the objective 11 as shown in FIG. 5, it also has a further mirror surface 61 disposed laterally relative to the optical axis 12 of the objective 11.

For controlling the lamp brightness and for adaptation to different power supply frequencies, etc., the electrical control unit 8 is provided with control means 61' therefor. As is seen especially from FIG. 5, it may be advantageous to provide the light guide 47 with refracting surfaces for the light on the entrance and exit sides. It is, of course, not necessary to provide the electrical control unit 8 with a halogen lamp 34; and a lamp 7 of high luminosity, for example, a xenon lamp, may be sufficient.

While I have disclosed one embodiment of the present invention, it is to be understood that the embodiment is given by example only and not in a limiting sense.

What I claim is:

1. In a projector adapted for use with a projection lamp, the latter being controlled from outside of the projector casing by a separated electrical control unit located outside of the projector casing and electrically connected to the projection lamp, the control unit supplying electrical energy to the projection lamp,
    a projector casing having a plurality of walls,
    optical means disposed within said projector casing defining an optical axis,
    means for aligning a projection lamp with said optical axis,
    manually operable mode selector means on the projector for controlling at least one mechanical operation mode of the projector,
    connecting means for the separated electrical control unit outside said casing for controlling the projection lamp from outside the casing and for providing the projection lamp with electric energy,
    the improvement comprising in combination:
    said connecting means additionally performing the function of operatively connecting said mode selector means to said separated electrical control unit, and
    said mode selector means on the projector constituting means for controlling said separated electrical control unit for controlling the projection lamp from the projector via said connecting means.

2. The projector, as set forth in claim 1, further comprising
    at least one relay means for switching said separated electrical control unit on and off, respectively,
    said mode selector means for controlling said at least one relay means.

3. The projector, as set forth in claim 1, wherein
    said separated electrical control unit includes a voltage supply circuit means for supplying said control unit with electrical energy for said projection lamp,
    said mode selector means includes a control circuit separated from said voltage supply circuit means.

4. The projector, as set forth in claim 1, further comprising
    film gate means forming a film aperture aligned with said optical axis for guiding and framing a film,
    cooling means for cooling said film within the range of said film aperture,
    sensing means for operatively sensing an operational condition of said cooling means, and
    interruptor means operatively connected to said sensing means for interrupting electrical energy to said projection lamp when said cooling means insufficiently cools, said sensing means for controlling said interruptor means.

5. The projector, as set forth in claim 1, wherein
    said aligning means comprise means for connecting and centering a separable projection lamp housing to said casing.

6. The projector, as set forth in claim 5, wherein
    said aligning means includes light guiding means for aligning light emitted by said projection lamp with said optical axis.

7. The projector, as set forth in claim 1, wherein said connecting means is detachably disposed on said projector casing.

8. A projection lamp housing for a projector comprising in combination:
    a lamp housing formed with an opening,
    a projection lamp disposed in said opening,
    springs resiliently connecting said lamp to said lamp housing,
    a mirror housing having a plurality of walls, said projection lamp rigidly mounted on said mirror casing,
    at least one of said walls having a dome-shaped segment portion with a flanged front surface forming engagement surface means for aligning with aligning surfaces provided in the projector.

9. A projection lamp housing for a projector, the latter defining an optical axis, comprising in combination:
    a casing having a plurality of walls including a lamp housing and adapted to house a projection lamp,
    connecting means on said casing for connecting and operatively centering the lamp housing to the projector,
    optical means on said casing for aligning light emitted from the projection lamp with the optical axis of the projector,
    means for adjusting said optical means for aligning light emitted from the projection lamp with the optical axis of the projector.

* * * * *